United States Patent [19]
Barlow et al.

[11] Patent Number: 5,630,421
[45] Date of Patent: May 20, 1997

[54] ULTRASOUND IMAGING

[75] Inventors: Christopher J. Barlow, Ontario, Canada; Robert J. Dickinson; David A. Wicks, both of London, England

[73] Assignee: Intravascular Research Limited, London, United Kingdom

[21] Appl. No.: 573,062

[22] Filed: Dec. 15, 1995

[30] Foreign Application Priority Data

Dec. 23, 1994 [GB] United Kingdom ............... 9426191

[51] Int. Cl.$^6$ ........................................ A61B 8/00
[52] U.S. Cl. ........................................ 128/662.06
[58] Field of Search .............. 128/660.08, 660.09, 128/660.1, 661.04, 660.04, 662.03, 662.05, 662.06

[56] References Cited

U.S. PATENT DOCUMENTS

| | | | |
|---|---|---|---|
| 5,081,993 | 1/1992 | Kitney et al. | |
| 5,322,066 | 6/1994 | Miyataka et al. | |
| 5,377,682 | 1/1995 | Ueno et al. | 128/660.1 |
| 5,421,338 | 6/1995 | Crowley et al. | 128/662.06 |
| 5,453,575 | 9/1995 | O'Donnell et al. | 128/662.06 |

FOREIGN PATENT DOCUMENTS 2268806  1/1994  United Kingdom.

*Primary Examiner*—George Manuel
*Attorney, Agent, or Firm*—Richard M. Goldberg

[57] ABSTRACT

An intravascular ultrasound imaging system in which data from an ultrasonic transducer array is digitized and processed in a pipeline, the latter having means to divert/extract data from the pipeline and reintroduce it into the pipeline to enable images to be displayed retrospectively.

16 Claims, 6 Drawing Sheets

ULTRASOUND IMAGING

The present invention relates to ultrasound imaging and more particularly to an intravascular ultrasound imaging system, an example of which is disclosed in our UK pending Application 2,268,806.

In such a system there is provided an ultrasonic transceiver consisting of an ultrasound transmitter circuit that can be programmed to vary the order in which the elements are excited and to vary the excitation pulse and an ultrasound receive circuit that converts the ultrasound echo signal into digital form. A high powered computer processes the ultrasound echoes, performs focusing, demodulates, converts to rectangular format and displays the data as a real time B-mode image.

In using ultrasound imaging systems it is known to provide the medical practitioner with the ability to review images already generated by the system by means of a known tape based video cassette recorder and player whereby the data representative of a generated ultrasound image is recorded on the video tape and can later be played back from the tape to enable the practitioner to review selected images.

Whilst this ability to play back images clearly enhances the usefulness of the ultrasound imaging system it is relatively inconvenient as it takes a significant amount of time to reach the relevant section of the tape and it is not always easy to access the desired part of the tape. Furthermore the image quality is often not of the desired standard.

The present invention is concerned with this problem and with providing an easily used and rapid arrangement for replaying such ultrasound images and at the same time improving the quality of the reproduced images.

In the system of our above mentioned pending application and also in the system disclosed in our U.S. Pat. No. 5,081,993, the image data is processed in a pipeline which allows a variety of methods for the software processing of the ultrasound echo signals. In a pipeline process the processing stages are divided into serial tasks, so that the result of one process is fed to the next. This has the advantage that it allows sharing of processors and thus a degree of parallel processing to take place.

The present invention is by way of an enhancement or improvement of such a system to provide the playback feature referred to earlier.

According to the present invention an intravascular ultrasound imaging system has the following combination of features:

(a) a transducer array mounted on the distal end of a catheter and electrically connected to a transceiver at the proximal end of the catheter;

(b) the transceiver includes means for converting analogue echo signals generated by the ultrasound transducer into digital signals and means for processing those digital signals in a pipeline to produce a real-time image on a display;

(c) the pipeline consists of a number of data processing stages, and the data set varies in size at different points in the pipeline, and includes means to divert/extract the data at a convenient point in the pipeline from the pipeline and store it in a dedicated memory;

(d) the pipeline includes means to divert/extract the data from the pipeline and to store it in the memory; and (e) means to recall the stored data and reintroduce it into the pipeline at the same point that it was removed to retrospectively display the stored image.

By means of the present invention it is possible for the medical practitioner to replay images much more easily than with the prior art arrangement using a tape based video recorder. Furthermore, because the images are stored in the form of digital data the replayed images will be faithfully reproduced without degradation and will thus be of a higher quality than images stored and replayed with the aforesaid prior art arrangement.

How the invention may be carried out will now be described by way of example only and with reference to the accompanying drawings in which.

FIG. 1

Figure 1:
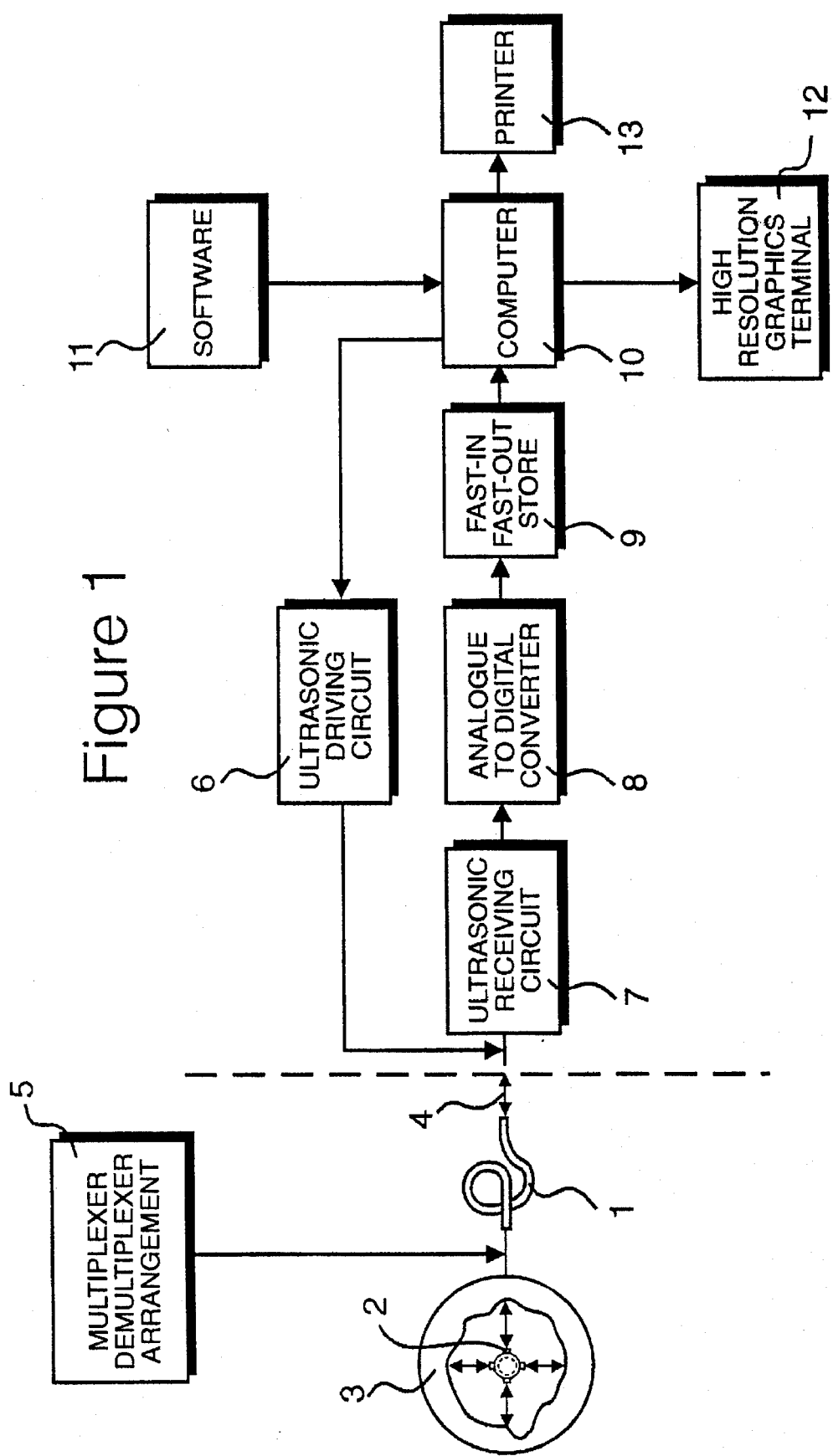
FIG. 1 is a block diagram illustrating an intravascular ultrasound imaging system to which the present invention can be applied.

An ultrasonic transducer array 2 is mounted on the distal end of a catheter 1 and is adapted to be inserted into an organ, e.g., artery 3 of a patient in known manner. The proximal end of the catheter 4 is connected to a transceiver arrangement shown to the right of the dotted line in FIG. 1. In order to reduce the number of electrical connections which have to pass the length of the catheter a multiplexer/demultiplexer arrangement 5 is provided.

The transducer array 2 is energised by an ultrasonic driving circuit 6 and signals representative of echo pulses received by the transducer array 2 are received by an ultrasonic receiving circuit 7. The analogue signals received by the circuit 7 are then converted into digital signals by an analogue-to-digital converter 8 and then passed via a fast-in-fast-out store 9 to a computer/processor 10 which is under stored program control by means of software 11.

Images representative of the interior of the artery 3 can be displayed on high resolution graphics terminal 12 or printed out by a printer 13.

FIG. 1 is merely to illustrate the kind of intravascular ultrasonic imaging system to which the present invention may be applied.

FIGS. 2 & 3

Figure 2:
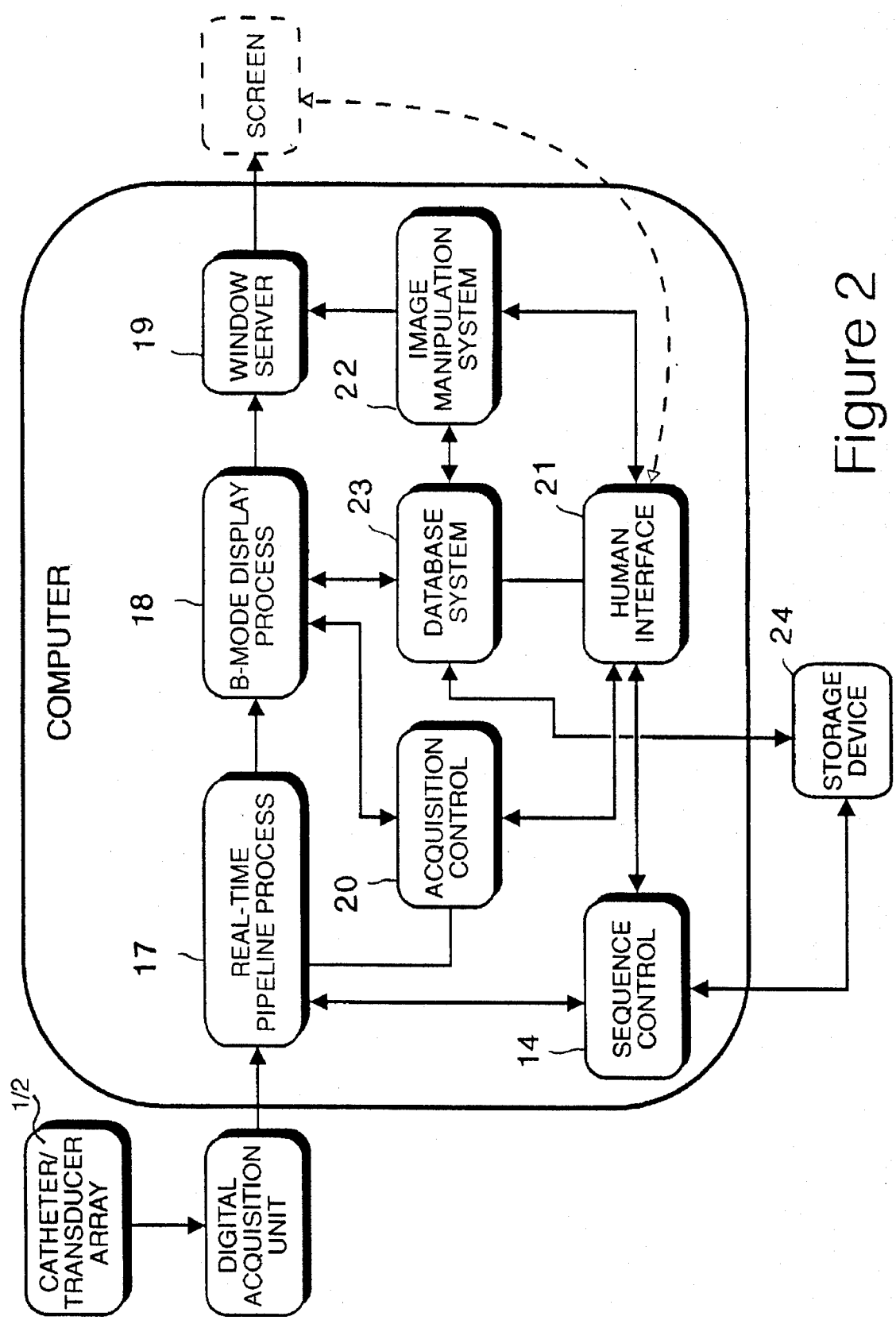
FIG. 2 shows how the software of FIG. 1 communicates with external peripheral equipment etc.

FIG. 2 shows in more detail the structure of the software 11 of FIG. 1. It consists of a processing pipeline 17, which processes the ultrasound data to give an ultrasound image, a B-mode display process 18, which manages the display of that data, and controls contrast and brightness, and communicates with the display window server 19, which incorporates industry standard display routines such as X-windows. Both the processing pipeline and the B-mode display process are managed by the acquisition control 20, which synchronises the processes and is controlled from the WIMP based human interface 21. The human interface also manages other processes such as image manipulation 22 which is not described in this specification, and it communicates with the database system 23, which manages data handling and file management, including data stored on the storage device 24.

Figure 3:
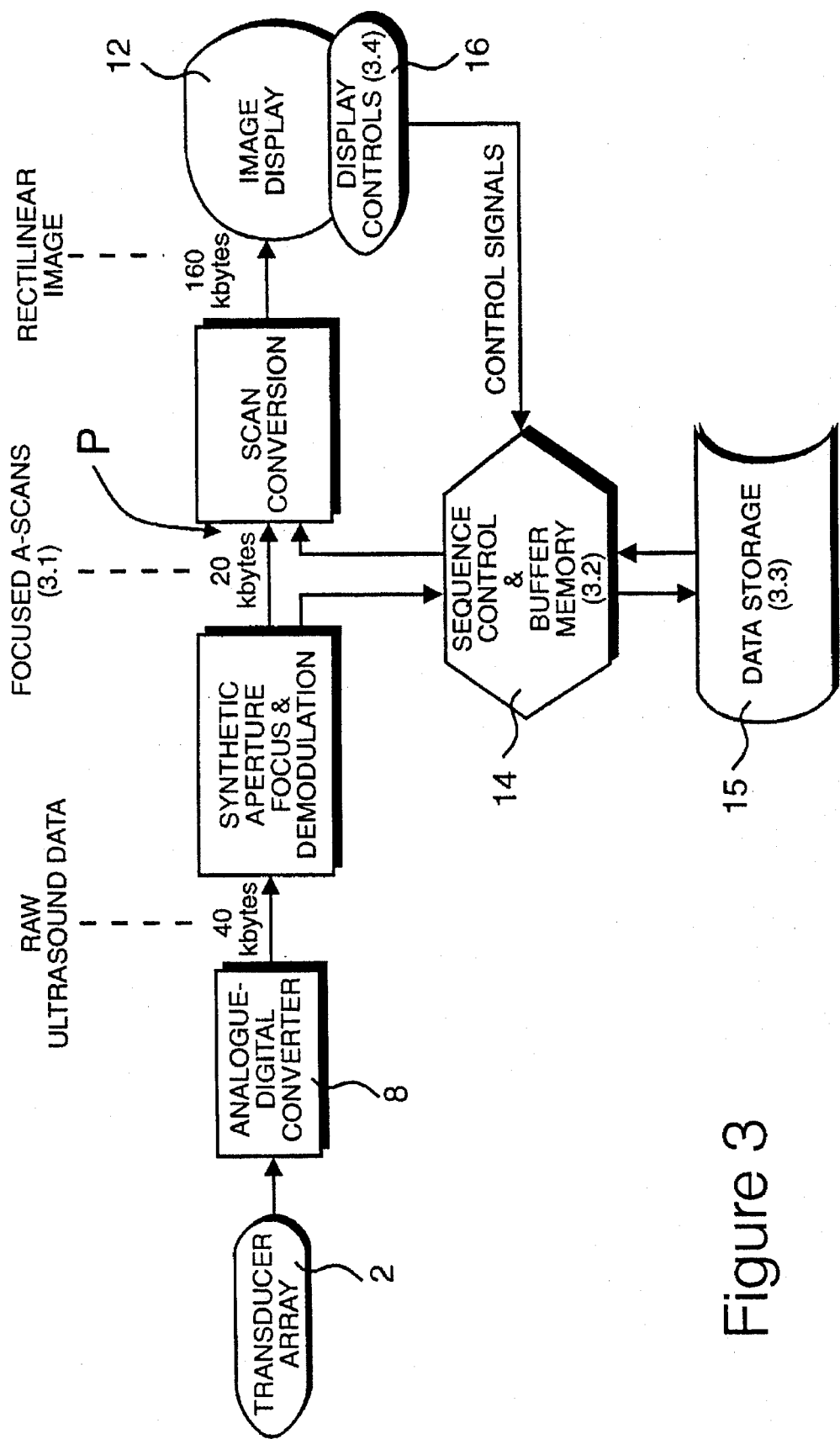
FIG. 3 illustrates the data processing pipeline from transducer array to image display.
Figure 4:
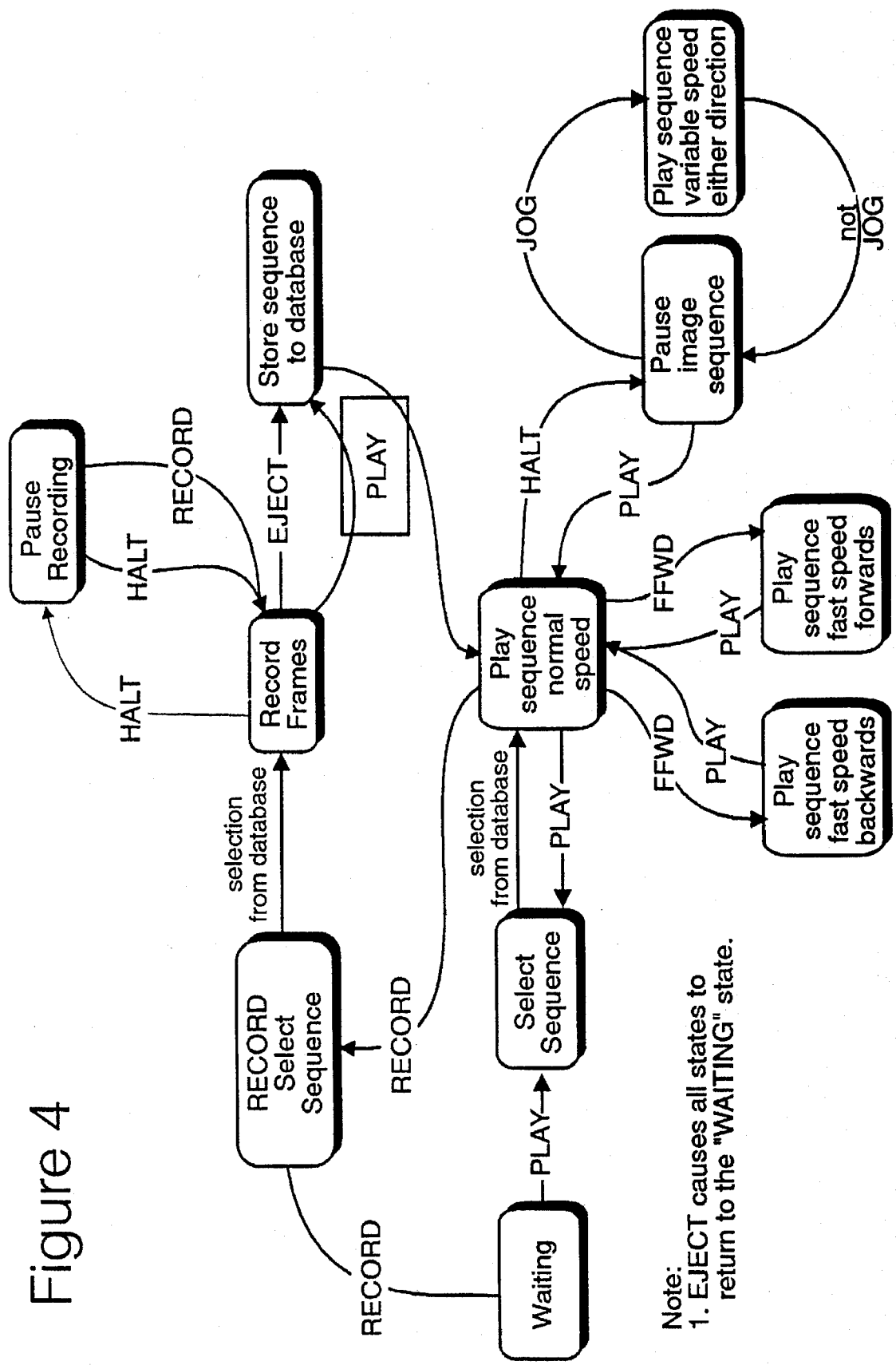
FIG. 4 is a state machine illustrating the B-mode image sequence operation.

The pipeline 17 is shown in more detail in FIG. 3 together with a sequence control 14.

The pipeline allows sharing of processors in a multi-process or architecture, and thus can accommodate parallel processing.

FIG. 3 shows the preferred embodiment of this pipeline in which the ultrasound data is focused to give a number of radial A-scans, and then converted to an X-Y display.

The focusing process is described in our co-pending UK application 9418630. The amount of data for each frame at different stages throughout the pipeline is shown in FIG. 3 for a typical set of parameters and at the focused A-scan stage the data is at its minimum size of 20 kbytes having been at 40 kbytes at the raw ultrasound data stage.

The computer system used to process the real-time B-mode images referred to above has sufficient electronic memory 1 to store this partially processed data frame by frame. The memory is a buffer memory in the sequence control 14. This data can then be transferred to an appropriate non-volatile magnetic or opto-magnetic storage media 15 as digital computer compatible files. With known double buffering techniques the sequence control process can transfer this data to storage while new data is being acquired, thus limiting the requirements on the buffer size. In this implementation one buffer is being filled with new data, whilst a second buffer is being transferred to storage, and the two buffers alternate their function. These simultaneous operations can be readily handled by a multi-tasking operating system such as UNIX.

This data can be later recalled from storage 15 and re-introduced into the processing pipeline at the same point P at which it was removed, and the processing continued until the final image is displayed at 12. The later stage processing will typically increase the amount of data as it is converted into a rectilinear image. Since there is no data lost, the net effect is as if the final video image had been stored, but using significantly less data and hence data storage. The control of the storage and retrieval is performed by a screen-based user interface 16, and since the delay in passing through the pipeline is of the order of the frame-to-frame interval, ie. 1/20 second, the effect of varying the controls appears to be instantaneous.

This then gives the equivalent of a video recorder but instead of being stored in analogue form on a magnetic tape, it is stored as digital data which will have the following advantages:

(i) Data is stored in digital form, so will be faithfully reproduced on replay, without the signal loss or distortion associated with tape based systems.

(ii) Other information, for example patient name and details, details of the scanning session, can be stored with the sequence, facilitating retrieval of sequences.

(iii) Once a sequence is identified and retrieved into memory, individual frames of data can be displayed in any order. Thus the display speed and direction can be altered very quickly as it is not restricted by the limitations of a video tape mechanism. The frame number or the elapsed time can be displayed and used to locate individual frames.

(iv) Since the invention is implemented on a high performance workstation using a windows-based graphical user-interface the operation of this feature can be made to use a screen-based control panel which has a similar appearance to a conventional VCR, thus providing a familiar user interface.

FIG. 4

This is a state machine which illustrates the recordal and playback of the B-mode images.

FIGS. 5 AND 6

Figure 5:
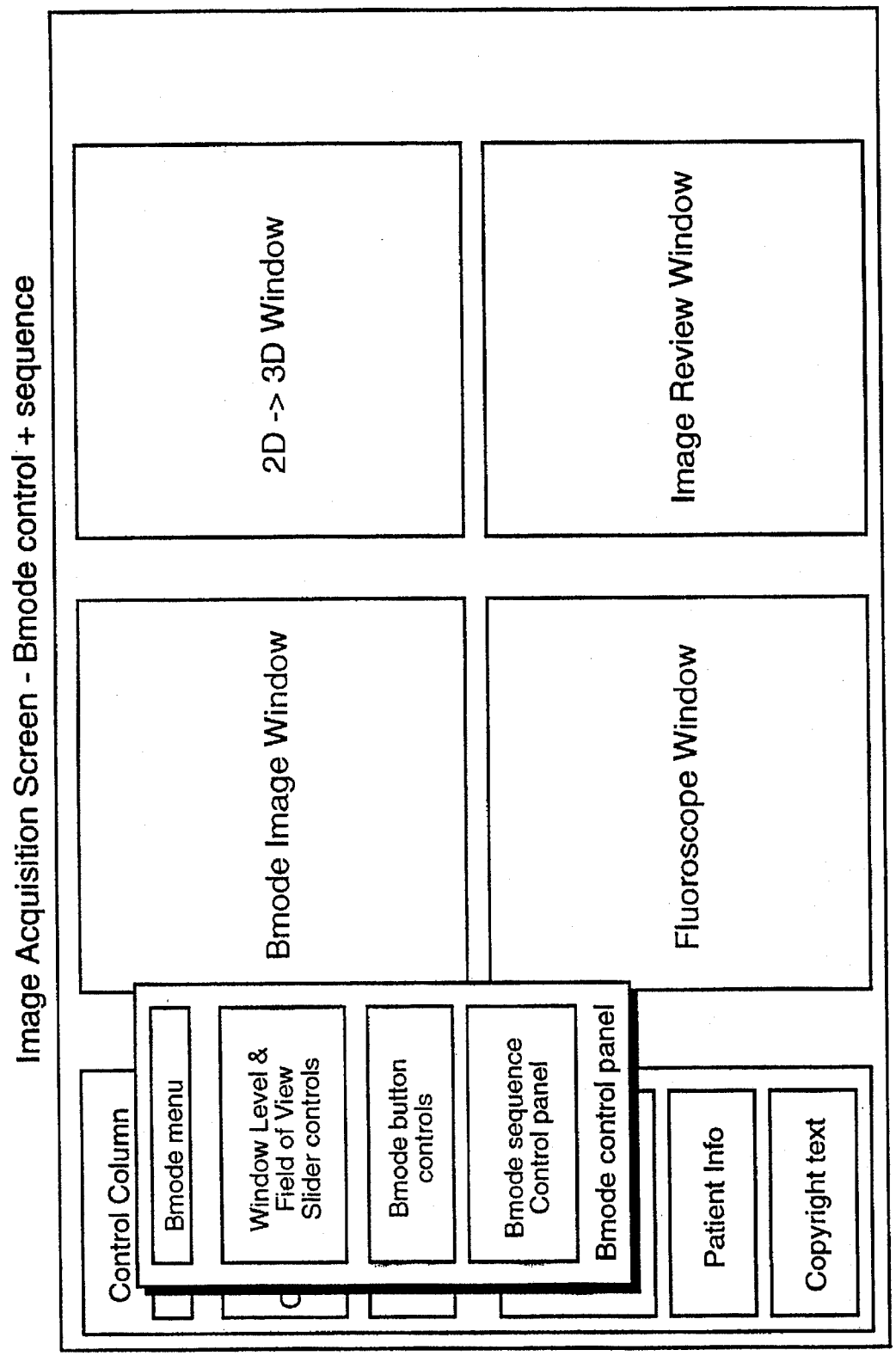
FIG. 5 is a diagrammatic representation of the display screen and associated control.
Figure 6:
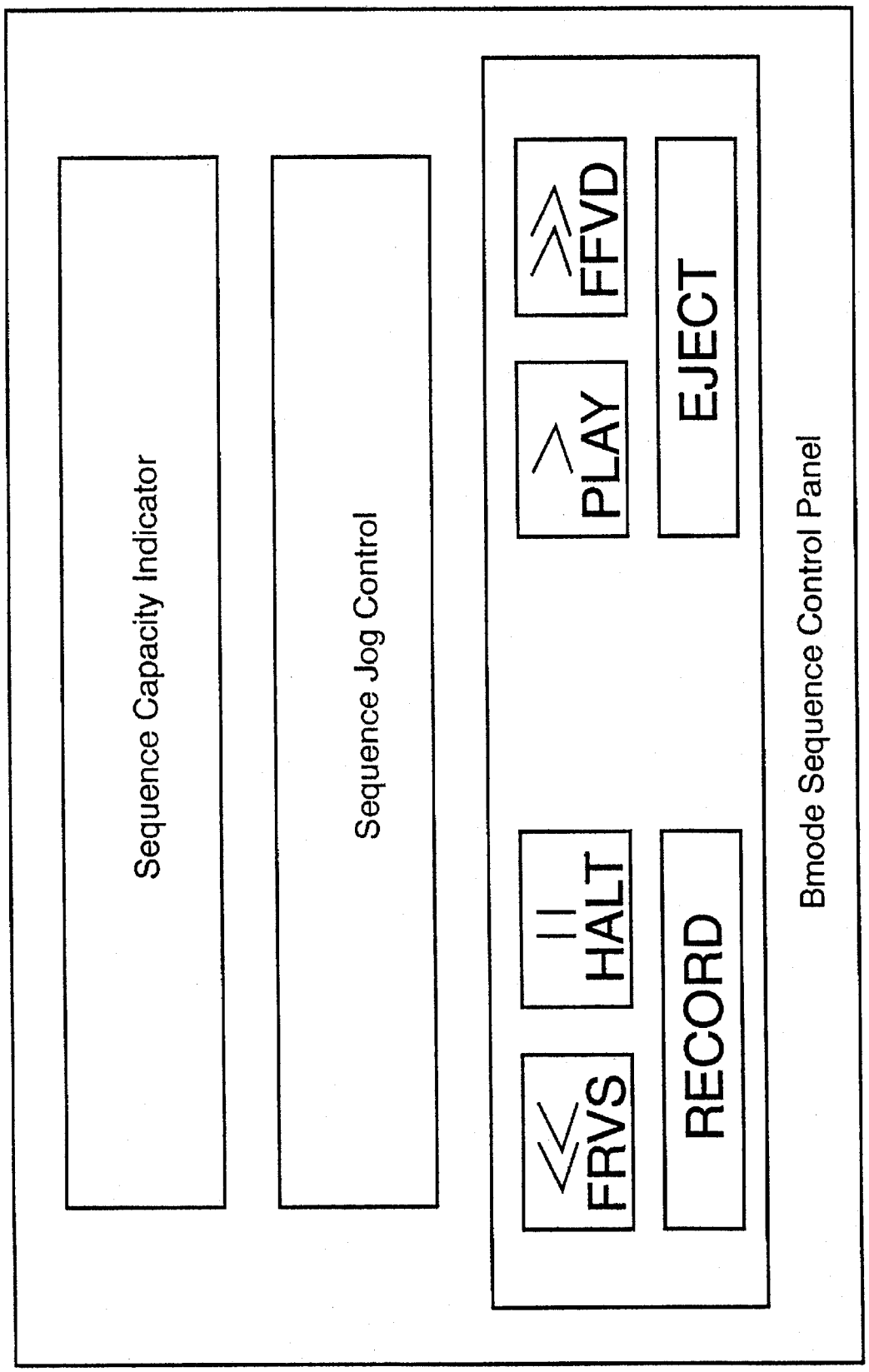
FIG. 6 is an enlarged view of the B-mode sequence control panel shown in FIG. 5.

These figures illustrate the screen layout seen by the user as compared with FIGS. 1 to 4 which describe how the system operates. FIG. 5 illustrates how the screen based controls are positioned on the display 12, adjacent to the displayed image. FIG. 6 is an enlarged more detailed view of the B-mode sequence control panel shown in FIG. 5, demonstrating how the screen layout can be designed to present the user with a control panel that is familiar to users of conventional tape VCRs.

We claim:

1. An intravascular ultrasound imaging system having the following combination of features:

(a) an ultrasound transducer array mounted on a distal end of a catheter and electrically connected to a transceiver at a proximal end of the catheter;

(b) the transceiver includes means for converting analog echo signals generated by the ultrasound transducer array into digital signals and transferring those digital signals as data to a processing pipeline to produce a real-time image on a display;

(c) the pipeline includes a number of data processing stages for processing said data, with sets of said data varying in size at different points in the pipeline;

(d) the pipeline includes means to divert/extract data from the pipeline at at least one point prior to a final one of said data processing stages and to store the diverted/extracted data in a dedicated memory; and (e) means to recall the stored data and reintroduce the stored data into the pipeline at the same point that said stored data was removed, for further processing, to retrospectively display the stored image.

2. A system as claimed in claim 1 in which the data is extracted at a point in the pipeline where the data sent is at a minimum size.

3. A system as claimed in claim 2 having means to store the extracted data in a non-volatile memory.

4. A system as claimed in claim 3 in which the memory is in the form of a disc drive.

5. A system as claimed in claim 2 having means to control the real-time storage and retrieval of image sequences in the processing pipeline using screen based controls.

6. A system as claimed in claim 2 having means to store data in a database file system.

7. A system as claimed in claim 1 having means to store the extracted data in a non-volatile memory.

8. A system as claimed in claim 7 in which the memory is in the form of a disc drive.

9. A system as claimed in claim 8 having means to control the real-time storage and retrieval of image sequences in the processing pipeline using screen based controls.

10. A system as claimed in claim 8 having means to store data in a database file system.

11. A system as claimed in claim 7 having means to control the real-time storage and retrieval of image sequences in the processing pipeline using screen based controls.

12. A system as claimed in claim 7 having means to store data in a database file system.

13. A system as claimed in claim 1 having means to control the real-time storage and retrieval of image sequences in the processing pipeline using screen based controls.

14. A system as claimed in claim 13 having means to store data in a database file system.

15. A system as claimed in claim 1 having means to store data in a database file system.

16. An intravascular ultrasound imaging system, comprising:

(a) an ultrasound transducer array mounted on a distal end of a catheter for generating analog echo signals;

(b) a transceiver mounted at a proximal end of the catheter and electrically connected to the ultrasound transducer array, the transceiver including means for converting the analog echo signals generated by the ultrasound transducer array into digital signals;

(c) a pipeline connecting said transceiver to a display and including a number of data processing stages for processing said digital signals as data, with sets of said data varying in size at different points in the pipeline;

(d) the data processing stages including means for processing said digital signals in the pipeline to produce a real-time image on the display;

(e) a dedicated memory;

(f) means for diverting/extracting data at at least one point prior to a final one of said data processing stages in the pipeline and storing the diverted/extracted data in the dedicated memory; and (g) means for recalling the stored data and reintroducing the stored data into the pipeline at the same point that the stored data was removed, for further processing, to retrospectively display the stored image on the display.

* * * * *